2 Sheets—Sheet 1.
G. B. HARTSON.
MANUFACTURING METALLIC WHEELS.
No. 11,243. Patented July 11, 1854.
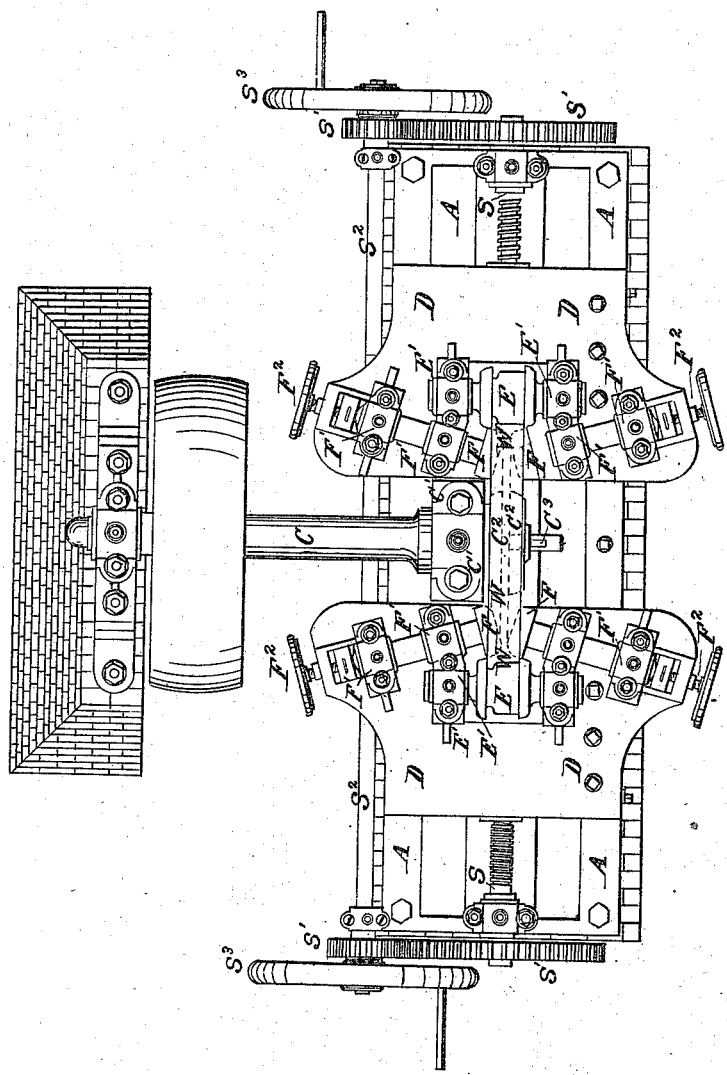

2 Sheets—Sheet 2.
G. B. HARTSON.
MANUFACTURING METALLIC WHEELS.
No. 11,243. Patented July 11, 1854.
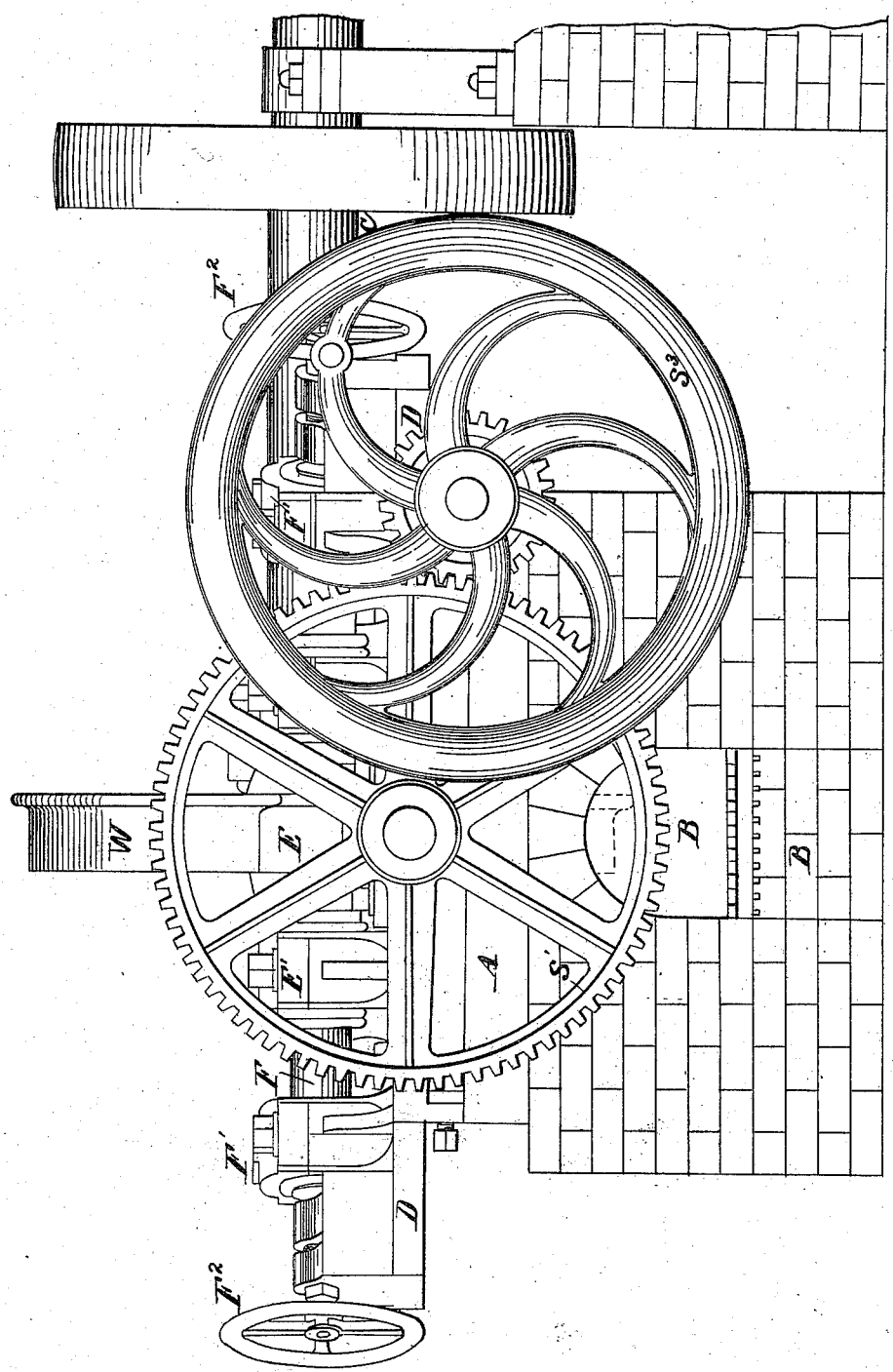

UNITED STATES PATENT OFFICE.

GEO. B. HARTSON, OF NEW YORK, N. Y.

MAKING WROUGHT-IRON CAR-WHEELS.

Specification of Letters Patent No. 11,243, dated July 11, 1854.

*To all whom it may concern:*

Be it known that I, GEORGE B. HARTSON, of the city, county, and State of New York, have invented a new and useful process for making car and carriage wheels, belt-pulleys, and other articles of that class in which a wide tread or cylindrical periphery is supported by a comparatively narrow or thin disk.

I do not deem it necessary as prefatory to my specification to notice all of the many processes and machines which have been essayed for the purpose of making car wheels. There are three processes however in which it has been essayed to form a wheel with its tread and flange from a single solid disk which it is necessary for me to allude to. One of these was by placing a disk, thicker than that part of the wheel between the rim and the hub, upon a solid iron die. Another die shaped like the former namely in the inverse of one side of a finished wheel, was then caused to beat rapidly and violently upon the disk which it was thus attempted to forge or swage into shape. In another plan recently patented in this country a similar disk was inclosed between two dies which were revolved at great speed in opposite directions and at the same time forcibly compressed together. It was thus attempted to draw out and spin into shape a metallic disk. The third plan is of English origin and consisted in submitting to the action of a pair of conical rollers a disk similar to the others before named. These rollers were grooved in the inverse of a section of the wheel from hub to rim and it was supposed would draw the metal out, swage it where needed and finally perfect a wheel. Now these processes have one point of resemblance only with mine, viz., that they essay to form a solid spokeless wheel from a solid disk, but in all of them the original disk or blank was smaller than the finished wheel, or at any rate it was never essayed to compress the blank, making it smaller in diameter or as it is technically termed upsetting it.

Figure 1 is a top view of the apparatus and Fig. 2 is an end view thereof.

The machine is supported upon a solid metallic bed plate firmly bolted to a masonary foundation, within which is constructed a heating furnace. Through this bed plate is cut a slot and upon it are mounted strong pillow blocks, which support a shaft, which may be moved by any appropriate machinery. Upon this shaft and at the end thereof over the slot are fitted appropriate clamps or face plates or chucks for supporting the heated blank. The top of the bed plate is either grooved or feathered to serve as a guide for one or more carriages, capable of reciprocating motion to and from the shaft. Each of these carriages is provided with a screw or some appropriate device for causing it to traverse along the bed plate and carries at least one roller or compresses whose periphery is turned off in such manner as to form the inverse or intaglio of the periphery of a finished wheel. These rollers are mounted on appropriate pillow blocks and are free to revolve. Each carriage also supports one or more supporting rollers appropriately mounted and free to revolve, whose axes are best set in the plane which passes through the main shaft, but at an inclination to the line passing through the center of that shaft. These latter rollers are also so arranged that they can be adjusted endwise in the line of their own axis.

In the drawings $a$, is the bed plate; $b$ the furnace; $c$, the main shaft; $c'$, $c'$ its journal boxes, and $c^2$ $c^2$, the clamp or chucks shown in red lines, with a key $c^3$ for confining the blanks between them.

$e\ e$ are the compressing rollers, and $e'\ e'$ their pillow blocks, while the supporting rollers are shown at $f\ f$, their pillow blocks at $f'\ f'$ and a hand wheel and screw for moving them endwise at $f^2\ f^2$.

The wheel just finished is shown at $w$, while a section of that part of it between the hub and the tread is shown by the red lines.

A right and a left screw $s$ is supported on each end of the bed plate and takes in a nut beneath each carriage and attached thereto. These screws are connected each to each by gearing $s'$, and a shaft $s^2$ provided with hand wheels $s^3\ s^3$.

In working the machine a fire is lighted in the furnace, the hand wheels $f^2$ are turned so as to screw the supporting rollers toward the outer side of their carriages, and the hand wheel $s^3$ are turned so as to run the carriages with all their rollers out toward the ends of the bed plate, they key $c^3$ is knocked out and the outer clamp $c^2$ removed from the end of the shaft. A circular disk of heated metal with a hole in its center is now slipped on the shaft, the clamp is slipped on over it and the key driven firmly home, thus securing the disk upon the shaft, so that it must revolve therewith. This disk is of greater diameter than the finished wheel, the difference varying according to the quantity of metal needed for the tread and flange, and it is in thickness equal to that part of the wheel between the hub and tread, its thickness throughout being as nearly uniform as possible. I intend usually to cut this disk out of a sheet of thick plate iron. The disk being firmly fixed, revolution is imparted to the shaft, which carries with it the disk, exposing all parts of it in turn to the fire. An attendant now turns the hand wheels $s^3$, and forces the carriages rapidly toward each other until the compressing rollers touch the disk. The carriages are then approached more slowly, and the supporting rollers brought up against the disk and the upsetting rollers begin to turn, the disk being more and more upset and thus gradually forming the rim, which is supported and shaped on its inner side by the supporting rollers, which also prevent any gimbling of the disk. All these motions go on together or nearly so until the tread is upset and formed, making a complete and finished wheel with the exception of the hub. When finished the carriages and rollers are run back, commencing with the supporting rollers, the shaft is stopped, the key knocked out, and the finished wheel removed. Another blank or disk already heated supplies its place and the same movements of the various parts are again repeated. A good tread has been formed by my process without any supporting rollers. These may therefore be considered more in the light of accessories, which produce a more perfect finish, than of essentials absolutely necessary in producing the tread or rim and flange, and it is clear that these rollers may be brought into action at any time when deemed necessary instead of at the very commencement of the operation as heretofore described. The hub of the wheel thus far finished may be completed in any of the many ways known to makers of wrought iron wheels, and I intend in some cases to commence such a hub by thickening up the margin of the central hole in the disk, much in the same manner that I compress and upset its exterior periphery. Any expanding mandrel or eccentric whose throw can be varied while it is in motion will form a good tool for thus upsetting the margin of the small central hole in the disk.

Now it is obvious as I before stated that the apparatus for carrying out my process may be variously modified. Non-revolving tools for instance might take the place of the supporting and upsetting rollers, although their effect would not be so good, or the blank might be supported upon a stationary mandrel and the bed plate with its rollers be caused to rotate around it, and many other modifications of like character might be described. It is also clear that some parts of my invention might be employed without others. For instance the upsetting rollers might be used with tolerable effect without the supporters and either or both might be used without the fire.

Having thus described my process for making car and other wheels, etc., what I claim therein as new of my own invention and desire to secure by Letters Patent of the United States is—

The converging or centripetal pressure rolls arranged and operating as herein set forth, to form a tread or rim on the outer margin of a thin disk of metal by thickening the said margin and molding it into the required shape, as described, whether the sides of the disk, within the rim, be supported by clamp rolls as herein set forth, or not, and also whether the disk be heated simultaneously with the compression or not.

In witness whereof I have hereunto set my hand in the presence of two witnesses on this 17th day of May, A. D. 1853.

G. B. HARTSON.

Witnesses:
ADDISON S. DROSSY.
ARCHUBALD ANDERSON.